May 19, 1970

W. R. BERTELSEN 3,512,602

AIR-CUSHION VEHICLE

Filed Nov. 30, 1967

INVENTOR.
WILLIAM R. BERTELSEN
BY Roger W Nolan Jr
ATTORNEY

May 19, 1970 W. R. BERTELSEN 3,512,602
AIR-CUSHION VEHICLE
Filed Nov. 30, 1967 2 Sheets-Sheet 2

INVENTOR.
WILLIAM R. BERTELSEN
BY *Roger W. Nolan Jr.*
ATTORNEY

United States Patent Office 3,512,602
Patented May 19, 1970

3,512,602
AIR-CUSHION VEHICLE
William R. Bertelsen, Rock Island, Ill., assignor of one-fourth each to William E. Martin, Kewanee, Ill., and Martin Engineering Company, Neponset, Ill., a corporation of Illinois
Filed Nov. 30, 1967, Ser. No. 687,010
Int. Cl. B60v 1/00, 1/06
U.S. Cl. 180—115                    17 Claims

ABSTRACT OF THE DISCLOSURE

Improved crawler track, end and side seal apparatus for improving the pressurization characteristics of the base of an air-cushion vehicle. Said apparatus including full width rolling elements, ground engaging crawler track and inflatable side sealing means disposed between the rollers and tracks. Further disclosed is a vehicle wherein its weight is distributed over a maximum area for maximum flotation or traction.

BACKGROUND OF THE INVENTION

Field of invention

An improvement in apparatus for pressurizing the base of an air-cushion vehicle.

Description of the prior art

Vehicles of the type herein described are of two main types, the conventional crawler vehicle and the air lubricated crawler vehicle. The conventional crawler vehicle is a complex multipart slow speed vehicle having a small area of ground contact compared to the total base area of the vehicle and thus an expensive and high maintenance vehicle and limited in its load-carrying capacity. The air lubricated crawler which is an improvement over the conventional crawler vehicle but has less than the optimum of ground contact area versus the total base area and is further restricted by the limited pressure which can be applied within the vehicle base.

SUMMARY OF THE INVENTION

The present invention provides a novel air cushion vehicle wherein the combination of full width rolling elements, ground engaging crawler tracks and side sealing means provide for improved pressurization characteristics of the vehicle. More particularly the combination of a full width rolling element, a pair of ground engaging crawler tracks engaging the periphery of the rolling elements and pressurized tubing side sealing means disposed to effect a seal between rolling elements, tracks and vehicle plenum provides pressurization to one hundred times pressurization of present open base vehicles. An object of the present invention is to provide an air cushion vehicle wherein the improved sealing of the vehicle base permits the maximum of flotation for load carrying capabilities and traction for drive, braking and steering. A further object is to provide an air cushion vehicle which has speed and utility and is efficient, reliable and versatile. A still further object is to provide an air cushion vehicle having the above described elements which are suitable for air lubrication of the rolling elements and tracks and thus provides substantially frictionless operation.

DETAILED DESCRIPTION OF THE PREPARED EMBODIMENT

Description

Figure 1:
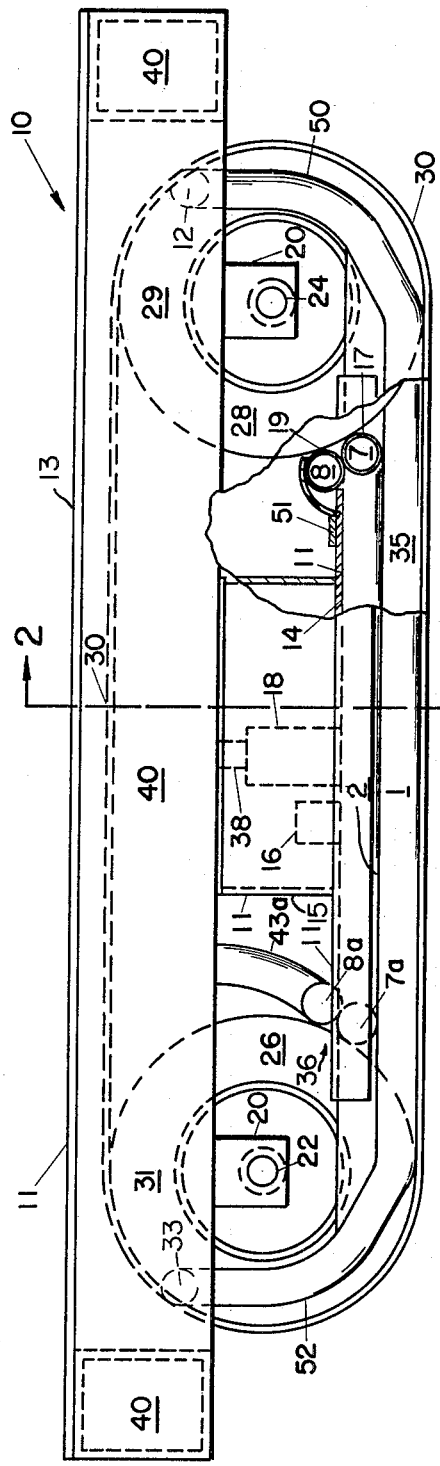
FIG. 1 is a side elevational view of the air cushion vehicle of this invention.

With reference to the drawing and in particular FIG. 1, the air-cushion vehicle of the invention, indicated generally at 10, is illustrated as consisting of a vehicle frame 11 which includes a vehicle deck, vertical supports 15 and a plenum deck 14. Mounted on deck 14 is a pressure relief valve 16 and air compressor 18.

Rigidly mounted on vehicle frame 11 are brackets 20 disposed to receive axle 22 and drive axle 24. Vehicle power means (not shown) is disposed to drive said drive axle 24 and is connected thereto by any suitable drive means (not shown).

Figure 2:
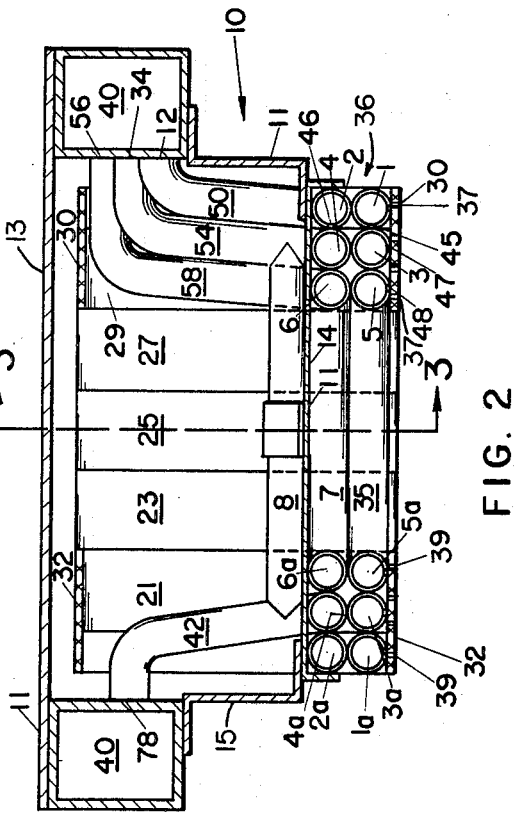
FIG. 2 is a vertical cross-sectional view taken through the vertical center line of the air cushion vehicle shown in FIG. 1.

Rolling elements 26 and 28 are mounted on axles 22 and 24, respectively, by any suitable conventional means. Advantageously, elements 26 and 28 may be of the inflatable type and within the scope of the invention elements 26 and 28 may include a plurality of slick tires mounted side by side on axles 22 and 24. Slick tires when utilized as elements 26 and 28 are the type having their ground engaging surface, tire periphery, smooth and without any treads. In FIG. 2 there is shown rolling element 28 comprising the side by side mounting of tires 21, 23, 25, 27, and 29.

Flexible crawler tracks 30 and 32 are disposed to engage the peripheral portion of rolling elements 26 and 28. Advantageously, the rolling elements 26 and 28 are smaller in diameter in the area where tracks 30 and 32 engage the rolling elements 26 and 28, thereby permitting rolling elements 26 and 28 and tracks 30 and 32 to be ground engaging elements. In the embodiment of the invention shown in FIGS. 1 and 2 wherein slick tires are utilized as rolling elements 26 and 28, the outer tires 29 and 31 engage track 30 and outer tire 21 and the corresponding outer tire of element 26 (not shown) engage track 32 and are smaller diameter tires permitting rolling elements 26 and 28 and tracks 30 and 32 to be all ground engaging elements. Tracks 30 and 32 advantageously include a plurality of air holes disposed therethrough for cooling and declodding of the tracks 30 and 32 air holes 39 are disposed through track 32 and air holes 37 are disposed through track 30.

The air plenum 35 of the vehicle 10 is defined by deck 14, rolling elements 26 and 28 and tracks 30 and 32 and sealed by means of the tubing generally designated by the numeral 36. Air plenum 35 is in direct fluid communication with air compressor 18 and overpressure of plenum 35 is prevented by means of relief valve 16 in fluid communication therewith.

Tubing 36 is pressurized by means of air compressor 18 and is in fluid communication therewith by means of tubing 38 and air duct-reservoir 40. The tubing designated by the numeral 36 is not continuous and various elements thereof are in direct fluid communication with reservoir 40 in the manner hereinafter described. The tubing 36 is advantageously arranged for sealing, air lubrication and declodding.

In FIG. 1 the tubing 36 is shown including tubing elements 7 and 8 disposed to provide an effective seal between plenum deck 14 and rolling element 28. Tubing 7 includes a plurality of air holes 17 and tubing 8 includes a plurality of air holes 19, said air holes 17 and 19 are advantageously disposed for air lubrication, cooling and declodding of rolling element 28. Tubing 7 and 8 are joined together at each end to form single tubing elements which are in fluid communication with air duct-reservoir 40. Illustrative of this arrangement there is shown in FIG. 2 tubing elements 7 and 8 in fluid communication with single tubing 42 which is in fluid communication with reservoir 40 through inlet port 78. Identical tubing elements 7a and 8a perform the same function as elements 7 and 8 and are disposed at the front of vehicle 10 and are joined at each end to form tubing 42a (shown in FIG. 3) and 43a which are in fluid communication with reservoir 40.

Referring now to FIG. 2 the tubing which is generally designated by the numeral 36 is shown including tubing elements 1, 2, 3, 4, 5 and 6 which are disposed to provide an effective seal between track 30 and plenum deck 14 and tubing elements 1a, 2a, 3a, 4a, 5a, and 6a, which are disposed to provide an effective seal between track 32 and plenum deck 14. The air cushion vehicle 10 is symmetrical along vertical center line 3—3 and the tubing elements 1a through 6a perform the same function and ar identical to the tubing elements 1 through 6. Tubing 1 includes a plurality of air holes 45, tubing 2 includes a plurality of air holes 46, tubing 3 includes a plurality of air holes 47 and tubing 5 includes a plurality of air holes 48, said air holes 45, 46, 47 and 48 advantageously disposed for air lubrication, cooling and declodding of rolling elements 26 and 28 and track 30. Tubing 1 and 2 are joined at each end (see FIG. 1) to form tubing 50 and 52 which are in fluid communication with air-duct reservoir 40 through inlet port 12 and inlet port 33 respectively. Tubing 1a and 2a are identical to tubing 1 and 2 and are joined and in fluid communication with reservoir 40. Tubing 3 and 4 are joined at each end; one end forms tubing 54 which is in fluid communication with air-duct reservoir 40 through inlet port 34 similarly the second end forms a tubing (not shown) which is in fluid communication with air-duct reservoir 40. Tubing 3a and 4a are identical to tubing 3 and 4 and are joined and in fluid communication with reservoir 40. Tubing 5 and 6 are joined at each end; one end forms tubing 58 which is in fluid communication with air-duct reservoir 40 through inlet port 56 similarly the second end forms a tubing (not shown) which is in fluid communication with air-duct reservoir 40. Tubing 5a and 6a are identical to tubing 5 and 6 and are joined and in fluid communication with reservoir 40. In FIG. 2 for the purpose of clearly illustrating the invention tubing corresponding to tubing 42, 50, 54 and 58 are omitted.

Plenum 35 is pressurized as heretofore disclosed by means of air compressor 18. A second air compressor may be utilized to pressurize plenum 35 independently of tubing 36. The air reservoir 40 is utilized for supply and control of the air passing from compressor 18 to tubing 36 and within the scope of the invention to plenum 35.

Advantageously, plenum 35 may be utilized as a suction chamber when it is desirable to obtain more traction by tracks 30 and 32. It can thus be seen that air cushion vehicle 10 has additional utility where increased vehicle traction is required.

Figure 3:
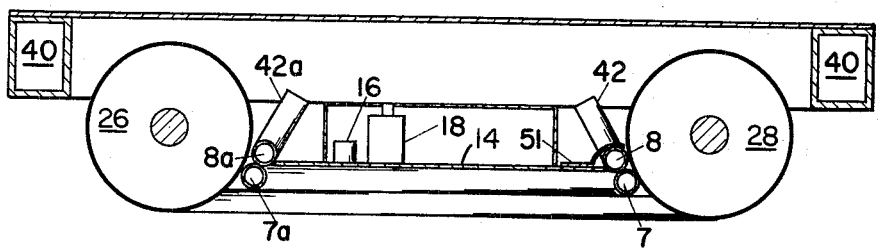
FIG. 3 is a vertical cross-sectional view taken through the vertical center line of the cross sectional view shown in FIG. 2.

Referring now to FIG. 3 there is shown a clearer illustration of tubing elements 7, 8, 7a and 8a and their functional position to create a seal between plenum deck 14 and rolling elements 26 and 28. Further there is shown adjustable plate 51 for maintaining tubing 7 and 8 in the correct relationship between rolling element 28 and deck 14.

Figure 7:
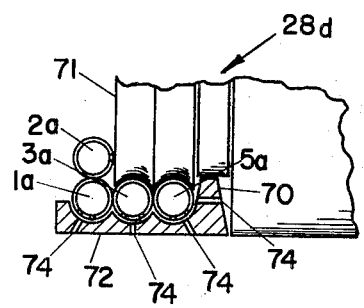
FIG. 7 is a fragmentary cross-sectional view of a modification of the tire and belt arrangement shown in FIG. 2.

Referring now to FIG. 7 there is shown a modification of the present invention wherein the rolling element 28d includes a contoured outer tire 71 to accommodate the tubing elements 3a and 5a. Track 72 is contoured to accommodate tubing elements 1a, 3a and 5a and further track 72 includes a V-section 70 which further prevents the track 72 from being affected by outward pressures. Track 72 includes a plurality of air holes 74 for cooling and declodding purposes. It can be seen that for particular application this structural modification will produce advantageous results.

Figure 4:
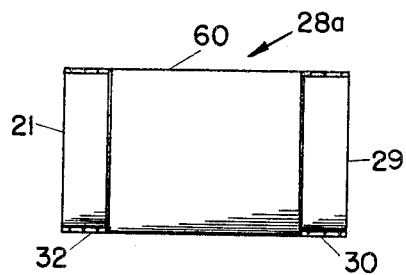
FIG. 4 is a diagrammatic end view of a modified arrangement of the air cushion vehicle illustrating a tire-roller combination.
Figure 5:
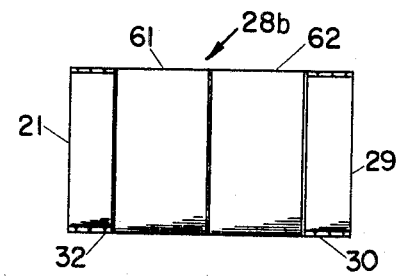
FIG. 5 is a diagrammatic end view of a modified arrangement of the air cushion vehicle illustrating a tire-roller combination.
Figure 6:
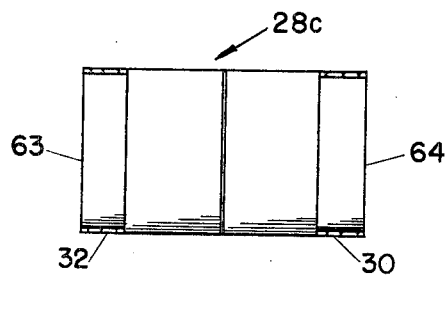
FIG. 6 is a diagrammatic end view of a modified arrangement of the air cushion vehicle illustrating a roller combination.

Referring now to FIG. 4, 5 and 6 there are shown modifications of the present invention which may be made to the rolling elements 26 and 28. As heretofore described with reference to FIG. 2 the rolling element 28 is shown to include a pair of outer racing slick tires 21 and 29 and a plurality of inner tires 23, 25 and 27 of larger diameter. The rolling element 28 and the tracks 30 and 32 thus provide a complete ground engaging combination thereby minimizing air leakage from plenum 35. The modifications shown in FIGS. 4, 5 and 6 also provide a complete ground engaging combination.

In FIG. 4 there is shown rolling element 28a including tires 21 and 29 and roller 60. In FIG. 5 there is shown rolling element 28b including tires 21 and 29 and rollers 61 and 62. In FIG. 6 there is shown rolling element 28c including rollers 63 and 64 the outermost portion being formed of a smaller diameter to receive tracks 32 and 30.

Operation

In operation of the air cushion vehicle 10 air for vehicle operation is supplied by means of air compressor 18. The air for tubing 36 is supplied through air duct-reservoir 40 and maintains the tubing 36 in a substantially rigid position. The air supplied to plenum 35 is advantageously maintained at a slightly lower pressure than the pressure in tubing 36. The lifting area of the vehicle 10 is bounded by the center lines of the rolling elements 26 and 28 and outside edges of the tracks 30 and 32. All of the air utilized is confined except for leakage from plenum 35 and the controlled leakage from tubing 36.

As heretofore described a substantially absolute seal is affected by means of tubing 36, rolling elements 26 and 28 and tracks 30 and 32. The resultant high lifting pressure within plenum 35 permits maximum load carrying capabilities for the vehicle 10.

It will be understood that the air cushion vehicle which is herein disclosed and described is presented for the purposes of explanation and illustration and is not intended to indicate limits of the invention.

I claim:

1. An air-cushion vehicle having sealable full base pressurization thereby providing the vehicle with heavy payload capabilities comprising
    a vehicle frame including a plenum deck,
    a pair of rolling elements, one rolling element disposed at each end of said vehicle and mounted for rotation within said vehicle frame,
    a pair of continuous flexible tracks, one track disposed at each side of said vehicle and entrained about said rolling elements,
    inflatable means disposed for effecting a frictionless air seal between said plenum deck and said rolling elements and said tracks,
    a plenum defined by said plenum deck, said rolling elements and said inflatable means,
    air supply means disposed to introduce air under pressure to said plenum and said inflatable means.

2. An air-cushion vehicle according to claim 1 wherein said air supply means provides a pressure less than atmospheric into said plenum and a pressure greater than atmospheric into said inflatable means.

3. An air-cushion vehicle according to claim 1 wherein said inflatable means includes a plurality of inflatable tubing elements.

4. A vehicle according to claim 3 wherein said inflatable tubing elements comprises first tubing elements disposed to effect a frictionless air seal between said plenum deck and said rolling elements and second tubing elements disposed to effect a frictionless air seal between said plenum deck and said tracks.

5. A vehicle according to claim 4 wherein said first tubing elements include air lubrication, air cooling and declodding means for said rolling elements and said second tubing means includes air lubrication, air cooling and declodding means for said flexible tracks.

6. A vehicle according to claim 5 further including air duct reservoir means disposed for storing and discharging air to said first and second tubing elements and said plenum.

7. An air cushion vehicle according to claim 3 wherein each of said rolling elements include a plurality of tires.

8. A vehicle according to claim 7 wherein said plurality of tires include outer tires having a smaller diameter than the inner tires, said inner tires and said tracks entrained about said outer tires are disposed to effect a single ground engaging element.

9. A vehicle according to claim 8 wherein said inflatable tubing elements comprises first tubing elements disposed to effect a frictionless air seal between said plenum deck and said rolling elements and second tubing elements disposed to effect a frictionless air seal between said plenum deck and said tracks.

10. An air cushion vehicle according to claim 3 wherein each of said rolling elements include a pair of rollers, said rollers having an outer portion of smaller diameter than the inner portion, said inner portion and said tracks entrained about said outer portion disposed to effect a single ground engaging element.

11. An air cushion vehicle having sealable full base pressurization thereby providing the vehicle with heavy payload capabilities comprising
 a vehicle frame including a plenum deck,
 a pair of rolling elements, one rolling element disposed at each end of said vehicle and mounted for rotation within said vehicle frame,
 a pair of continuous flexible tracks, one track disposed at each side of said vehicle and entrained about said rolling elements,
 a plurality of inflatable tubing element means disposed for effecting a frictionless air seal between said plenum deck and said rolling elements and said tracks,
 a plenum defined by said plenum deck, said pair of rolling elements and said plurality of inflatable tubing element means,
 air supply means disposed to provide a pressure less than atmospheric into said plenum and a pressure greater than atmospheric into said inflatable means.

12. A vehicle according to claim 11 wherein said inflatable tubing element means comprises first tubing elements disposed to effect a frictionless air seal between said plenum deck and said rolling elements and second tubing elements disposed to effect a frictionless air seal between said plenum deck and said tracks.

13. A vehicle according to claim 12 wherein said first tubing elements include air lubrication, air cooling and declodding means for said rolling elements and said second tubing means includes air lubrication, air cooling and declodding means for said flexible tracks.

14. A vehicle according to claim 13 further including air-duct reservoir means disposed for storing and discharging air to said first and second tubing elements.

15. A vehicle according to claim 14 wherein each of said rolling elements include a plurality of tires, said plurality of tires include outer tires having a smaller diameter than the inner tires, said inner tires and said tracks entrained about said outer tires are disposed to effect a single ground engaging element.

16. An air cushion vehicle having sealable full base pressurization thereby providing the vehicle with heavy pay load capabilities comprising
 a vehicle frame including a plenum deck,
 a pair of rolling elements, one rolling element disposed at each end of said vehicle and mounted for rotation within said vehicle frame, each of said rolling elements comprising a plurality of tires,
 a pair of continuous flexible tracks, one track disposed at each side of said vehicle and entrained about the outer tire of said plurality of tires, said outer tires having a smaller diameter than the inner tires, said inner tires and said tracks entrained about said outer tires are disposed to effect a single ground engaging element,
 a plurality of inflatable tubing element means comprising first tubing elements disposed to effect a frictionless air seal between said plenum deck and said rolling elements and second tubing elements disposed to effect a frictionless air seal between said plenum deck and said tracks, said first tubing elements including air lubrication, air cooling and declodding means for said rolling elements and said second tubing means including air lubrication, air cooling and declodding means for said flexible tracks,
 a plenum defined by said plenum deck, said pair of rolling elements and said plurality of inflatable tubing element means,
 air-supply means disposed to introduce air under pressure to said plenum and said plurality of tubing elements,
 air-duct reservoir means in fluid communication with said air supply means for storing and discharging air to said plurality of tubing elements.

17. An air-cushion vehicle according to claim 16 wherein said air supply means provide a pressure less than atmospheric into said plenum and a pressure greater than atmospheric into said air-duct reservoir.

References Cited

UNITED STATES PATENTS

| | | | |
|---|---|---|---|
| 1,698,482 | 1/1929 | Nicin | 180—115 |
| 3,168,069 | 2/1965 | Everest et al. | 180—119 X |
| 3,229,781 | 1/1966 | Jones | 180—127 X |
| 3,331,461 | 7/1967 | Eggington | 180—127 X |

FOREIGN PATENTS

| | | |
|---|---|---|
| 1,499,232 | 9/1967 | France. |

A. HARRY LEVY, Primary Examiner

U.S. Cl. X.R.

180—119